United States Patent
Kubota et al.

(10) Patent No.: US 6,824,262 B2
(45) Date of Patent: Nov. 30, 2004

(54) INK SET AND INK JET RECORDING METHOD

(75) Inventors: Kazuhide Kubota, Nagano (JP); Shuichi Kataoka, Nagano (JP); Kiyohiko Takemoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 10/216,546

(22) Filed: Aug. 9, 2002

(65) Prior Publication Data

US 2003/0116055 A1 Jun. 26, 2003

(30) Foreign Application Priority Data

Aug. 10, 2001 (JP) ........................................ 2001-244893
Aug. 9, 2002 (JP) ........................................ 2002-233978

(51) Int. Cl.⁷ .............................................. G01D 11/00
(52) U.S. Cl. ...................................... 347/100; 106/31.6
(58) Field of Search ....................... 347/100; 106/31.13, 106/31.6

(56) References Cited

U.S. PATENT DOCUMENTS 6,235,098 B1 * 5/2001 Maekawa et al. ........ 106/31.61
6,436,179 B1 * 8/2002 Hiraoka et al. .......... 106/31.58

FOREIGN PATENT DOCUMENTS

| JP | 9286940 | 11/1997 |
| JP | 10120956 | 5/1998 |
| WO | 9905230 | 2/1999 |

OTHER PUBLICATIONS

Patent Abstracts of Japan Publication No. 09–286940 dated Nov. 4, 1997.
Patent Abstracts of Japan Publication No. 10–120956 dated May 12, 1998.

* cited by examiner

*Primary Examiner*—Michael S. Brooke
(74) *Attorney, Agent, or Firm*—Ladas & Parry

(57) ABSTRACT

A problem of the present invention is to provide an ink set and an ink jet recording method, according to which a high-quality printed article can be provided for which deformation such as wrinkling does not occur, the color density is high, and there is little blotting or unevenness even if regular paper is used as the recording medium. An ink set of the present invention comprises at least inks of three colors, that is a yellow ink having a hue angle $\angle H°$ as defined in CIELAB color space on a recording medium in a range of approximately 80° to approximately 110°, a magenta ink having the above-mentioned hue angle $\angle H°$ in a range of approximately 330° to approximately 360°, and a cyan ink having the above-mentioned hue angle $\angle H°$ in a range of approximately 230° to approximately 260°; an ink (A) having the above-mentioned hue angle $\angle H°$ in a range of approximately 0° to approximately 80° and/or an ink (B) having the above-mentioned hue angle $\angle H°$ in a range of approximately 260° to approximately 330°; and a reaction liquid containing a reactant. [$\angle H° = \tan^{-1}(b^*/a^*) + 180°$ in the case that $a^* < 0$, and $\angle H° = \tan^{-1}(b^*/a^*) + 360°$ in the case that $a^* > 0$].

35 Claims, 6 Drawing Sheets

INK SET AND INK JET RECORDING METHOD

BACKGROUND OF THE INVENTION

1. Field of the Invention

The present invention relates to an ink set comprising at least inks of the three colors yellow, magenta and cyan, special inks of colors other than these three colors, and a reaction liquid containing a reactant, and more particularly to a pigment ink set and an ink jet recording method using this pigment ink set.

2. Description of the Related Art

Pigment inks are generally superior to dye inks in terms of the image fastness of printed articles, and are used in various applications that utilize this characteristic, for example as inks for wide format color ink jet recording aimed at the sign and display markets. In such color ink jet recording, normally a variety of hues are rendered by using a 3-color ink set comprising water-based pigment inks of the three colors yellow (Y), magenta (M) and cyan (C), which are the three primary colors for subtractive colormixing, or else a 4-color ink set in which black (K) is added to this 3-color ink set. Moreover, as ink sets having a broader color reproduction range than such 3-color and 4-color ink sets, ink sets have been proposed that contain water-based inks of colors such as orange and green in addition to the YMCK inks.

Moreover, with regard to improving the ink jet recording method using such a conventional ink set, an ink jet recording method in which a reaction liquid containing a reactant that acts to agglomerate the inks is used, i.e. a so-called two-liquid (inks plus reaction liquid) ink jet recording method, is known (see, for example, Japanese Patent Application Laid-open No. H9-286940, Japanese Patent Application Laid-open No. H10-120956 and International Patent Application Publication No. WO 99/05230). According to this two-liquid ink jet recording method, through the reaction liquid and an ink coming into contact with one another on a recording medium, the reaction liquid breaks down the dispersed state of an ink component such as a pigment, thus agglomerating the ink component to form an agglomerate on the recording medium, and hence a high-quality printed article with high color density and little blotting or unevenness can be obtained. With this two-liquid ink jet recording method, adequate coloring can be realized with regular paper, for which conventional ink jet recording methods have been inadequate, and hence the two-liquid ink jet recording method is particularly effective in the case that regular paper is used as the recording medium.

With the two-liquid ink jet recording method used up to now, a water-based reaction liquid is fired onto the recording medium in addition to the water-based inks, and hence the amount of water-based liquid fired onto the recording medium per unit area is greater than in the case of an ink jet recording method using a regular ink set not containing the reaction liquid. However, regular paper used as the recording medium is such that if a large amount of water comes into contact therewith, then hydrogen bonds between the cellulose fibers are broken at the parts where the water contacts the paper, and hence expansion occurs at these parts, causing deformation such as wrinkling. There has thus been a problem that, in the case that regular paper is used as the recording medium, the two-liquid ink jet recording method described above causes deformation such as wrinkling of the regular paper. The wrinkling becomes worse in particular at printed parts of secondary or higher order colors (mixed color parts) where the ink firing amount is high, greatly reducing the image quality of the printed article. The problem of wrinkling can be resolved by reducing the firing amount of the inks and the reaction liquid, but if the firing amount is reduced then the coloring ability drops.

SUMMARY OF THE INVENTION

It is thus an object of the present invention to provide an ink set and an ink jet recording method using the ink set, according to which a high-quality printed article can be provided for which deformation such as wrinkling does not occur, the color density is high, and there is little blotting or unevenness even if regular paper is used as the recording medium.

The present inventors carried out various studies into an ink jet recording method using an ink set comprising pigment inks of the three colors yellow, magenta and cyan and a reaction liquid containing a reactant, i.e. the so-called two-liquid ink jet recording method, and as a result discovered that if a pigment ink set is used that further comprises, in addition to the above, as special inks two pigment inks that have a hue angle $\angle H°$ as defined in CIELAB color space on a recording medium in a specified range, then when forming mixed color parts of secondary or higher order colors, due to using the special inks, characters and/or images with high coloring can be formed without firing a large amount of the inks, which would cause wrinkling with regular paper.

The present invention is based on the above finding, and attains the above object by providing an ink set comprising at least: inks of three colors, that is a yellow ink having a hue angle $\angle H°$ as defined in CIELAB color space on a recording medium in a range of approximately 80° to approximately 110°, a magenta ink having the above-mentioned hue angle $\angle H°$ in a range of approximately 330° to approximately 360°, and a cyan ink having the above-mentioned hue angle $\angle H°$ in a range of approximately 230° to approximately 260°; undermentioned ink (A) and/or undermentioned ink (B); and a reaction liquid containing a reactant.

Ink (A): An ink having the above-mentioned hue angle $\angle H°$ in a range of approximately 0° to approximately 80°.

Ink (B): An ink having the above-mentioned hue angle $\angle H°$ in a range of approximately 260° to approximately 330°.

[The above-mentioned hue angle $\angle H°$ is $\tan^{-1}(b^*/a^*)+180°$ in the case that $a^*<0$ and $\tan^{-1}(b^*/a^*)+360°$ in the case that $a^*>0$. $a^*$ and $b^*$ represent the perceived chromaticity indices as defined in CIELAB color space.]

Note that in the present invention, a glossy recording medium such as PM photographic paper (made by Seiko Epson Corporation) is used as the 'recording medium' when 'CIELAB color space on a recording medium' is mentioned.

Moreover, the present invention provides an ink set comprising: a yellow ink having an absorption spectrum with an absorption area over 400 nm to 500 nm in a range of 30 abs·nm to 350 abs·nm; a magenta ink having an absorption spectrum with an absorption area over 500 nm to 600 nm in a range of 20 abs·nm to 200 abs·nm; a cyan ink having an absorption spectrum with an absorption area over 600 nm to 700 nm in a range of 50 abs·nm to 400 abs·nm; undermentioned ink (A) and/or undermentioned ink (B); and a reaction liquid containing a reactant.

Ink (A): An ink having an absorption area over 500 nm to 600 nm equal to or greater than the absorption area over 500 nm to 600 nm of the above-mentioned magenta ink.

Ink (B): An ink having an absorption area over 500 nm to 600 nm equal to or greater than the absorption area over 600 nm to 700 nm of the above-mentioned cyan ink.

Moreover, the present invention provides an ink set comprising: a yellow ink having an absorption spectrum with an absorption area over 400 nm to 500 nm in a range of 30 abs·nm to 350 abs·nm; a magenta ink having an absorption spectrum with an absorption area over 500 nm to 600 nm in a range of 20 abs·nm to 200 abs·nm; a cyan ink having an absorption spectrum with an absorption area over 600 nm to 700 nm in a range of 50 abs·nm to 400 abs·nm; undermentioned ink (A) and/or undermentioned ink (B); and a reaction liquid containing a reactant.

Ink (A): An ink such that the absorption area over 400 nm to 500 nm of ink (A) is in a range of 0.5 times to 2.0 times the absorption area over 500 nm to 600 nm of ink (A).

Ink (B): An ink such that the absorption area over 500 nm to 600 nm of ink (B) is in a range of 0.5 times to 5.0 times the absorption area over 600 nm to 700 nm of ink (B).

Moreover, the present invention attains the above object by providing an ink jet recording method of forming characters and/or images on a recording medium using an ink set as described above.

Moreover, the present invention attains the above object by providing an ink jet recording method of forming characters and/or images on a recording medium using an ink set as described above, wherein droplets of the inks and the reaction liquid are discharged such that the inks and the reaction liquid come into contact with one another on the recording medium, and in the case of forming mixed color parts of one or more colors on the recording medium by mixing droplets of a plurality of the inks on the recording medium, at least one of the inks other than the ink (A) and the ink (B), and the ink (A) and/or the ink (B) are used.

Moreover, the present invention provides a recorded article on which characters and/or images have been formed using an ink jet recording method as described above.

EXPLANATION OF REFERENCE NUMERALS

Figure 1:
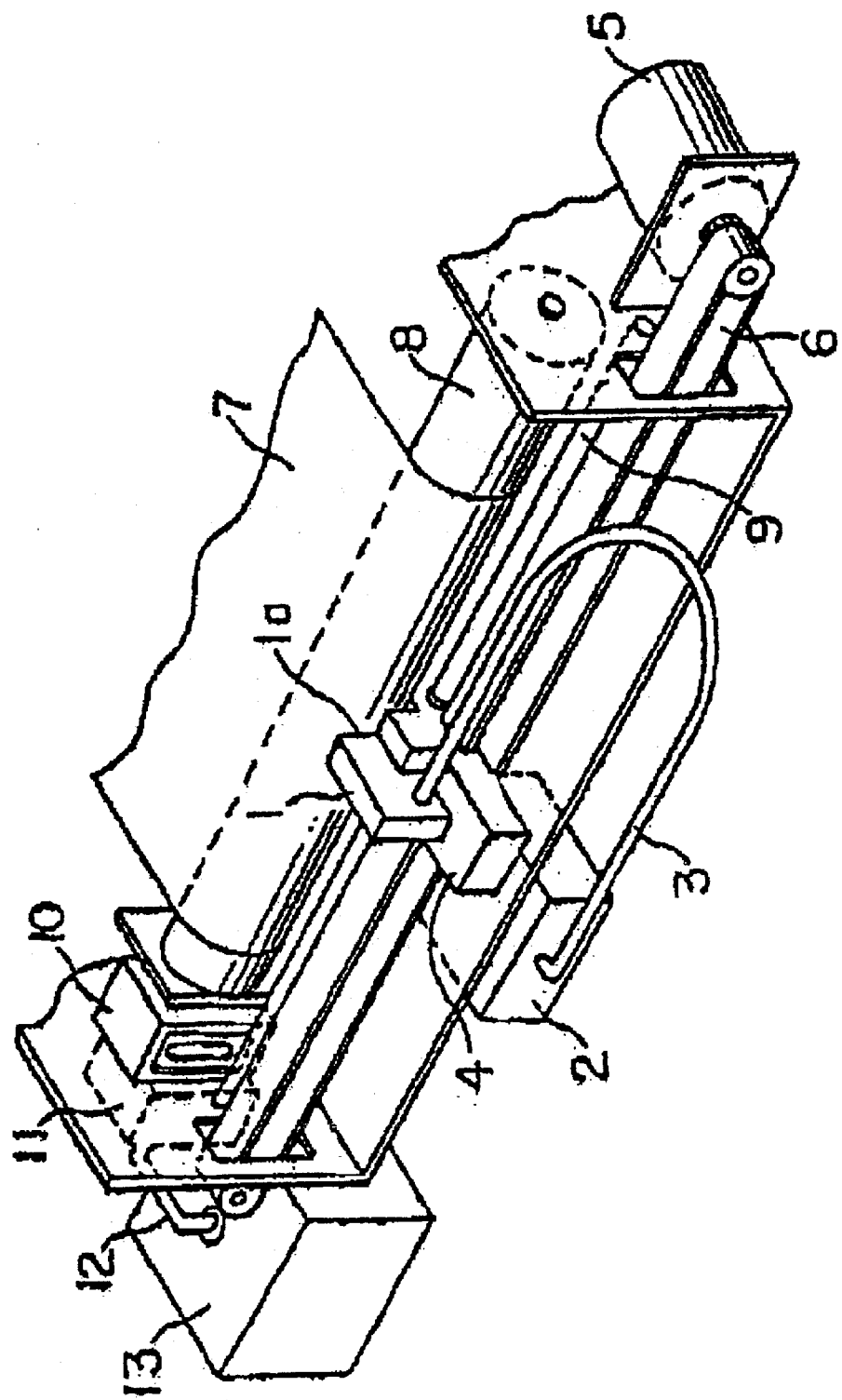
FIG. 1 is a perspective view of main parts of an ink jet recording apparatus for implementing an ink jet recording method of an embodiment of the present invention.

1: recording head; 1b: reaction liquid nozzle surface; 1c: ink nozzle surface; 21, 41a, 41b: reaction liquid nozzles; 22 to 25, 42 to 45: ink nozzles; 7: recording medium; 31: reaction-liquid-attached region; 32: printed region.

DESCRIPTION OF THE PREFERRED EMBODIMENTS

First, a description will be given of the ink set of the present invention through a preferable embodiment thereof.

The ink set of the present embodiment comprises inks of the three colors yellow, magenta and cyan, special inks of two colors, that is an ink (A) and an ink (B), and a reaction liquid containing a reactant.

The ink (A), which is one of the special inks, is an ink having a hue angle ∠H° as defined in CIELAB color space on a recording medium in a range of approximately 0° to approximately 80°. The hue angle ∠H° is $\tan^{-1}(b^*/a^*)+180°$ in the case that $a^*<0$ and $\tan^{-1}(b^*/a^*)+360°$ in the case that $a^*>0$. $a^*$ and $b^*$ represent the perceived chromaticity indices as defined in CIELAB color space.

It is preferable for the ink (A) to be an ink such that the chroma $C^*_{(Y+M)}$ for a hue angle $\angle H°_{(Y+M)}$ obtained by mixing on a recording medium a weight $I_Y$ of the yellow ink and a weight $J_{1M}$ of the magenta ink can be obtained by using an amount less than the weight $I_Y+J_{1M}$. The chroma $C^*$ is $\{(a^*)^2+(b^*)^2\}^{1/2}$.

Moreover, it is preferable for the chroma $C^*_A$ of the ink (A) to be higher than the chroma $C^*_Y$ of the yellow ink and/or the chroma $C^*_M$ of the magenta ink (i.e. $C^*_A > C^*_Y$ and/or $C^*_A > C^*_M$). The chroma $C^*_A$ of the ink (A) on a recording medium is preferably at least 80, more preferably at least 90.

Moreover, the hue range of the ink (A) on a recording medium is preferably such that $a^*$ is in a range of approximately 60 to approximately 80 and $b^*$ is in a range of approximately 20 to approximately 80, or $a^*$ is in a range of approximately 30 to approximately 60 and $b^*$ is in a range of approximately 60 to approximately 100.

The ink (B), which is the other one of the special inks, is an ink having a hue angle ∠H° as defined in CIELAB color space on a recording medium in a range of approximately 260° to approximately 330°.

It is preferable for the ink (B) to be an ink such that the chroma $C^*_{(M+C)}$ for a hue angle $\angle H°_{(M+C)}$ obtained by mixing on a recording ink can be obtained by using an amount less than the weight $J_{2M}+K_C$.

Moreover, it is preferable for the chroma $C^*_B$ of the ink (B) to be higher than the chroma $C^*_M$ of the magenta ink and/or the chroma $C^*_C$ of the cyan ink (i.e. $C^*_B > C^*_M$ and/or $C^*_B > C^*_C$). The chroma $C^*_B$ of the ink (B) is preferably at least 80, more preferably at least 90.

Moreover, the hue range of the ink (B) on a recording medium is preferably such that $a^*$ is in a range of approximately 50 to approximately 70 and $b^*$ is in a range of approximately −70 to approximately −50, or $a^*$ is in a range of approximately 40 to approximately 60 and $b^*$ is in a range of approximately −80 to approximately −60.

As the inks of the three colors yellow, magenta and cyan in the ink set of the present embodiment, inks of the three primary colors for subtractive color mixing commonly used in this kind of ink set can be used.

The hue angle ∠H° of the yellow ink is in a range of approximately 80° to approximately 110°, the hue angle ∠H° of the magenta ink is in a range of approximately 330° to approximately 360°, and the hue angle ∠H° of the cyan ink is in a range of approximately 230° to approximately 260°.

Moreover, the optical density (OD value) on a recording medium is preferably at least 1.7 for the yellow ink, preferably at least 1.0 for the magenta ink, and preferably at least 2.0 for the cyan ink.

If the lightness on the recording medium is 45 or more, then it is not necessary to set an upper limit on the OD value from the standpoint of graininess, but, for example, the OD value on the recording medium for the yellow ink is preferably in a range of 1.7 to 2.4, and to obtain a very high glossiness particularly preferably in a range of 1.7 to 1.9.

The OD value on the recording medium for the magenta ink is preferably in a range of 1.0 to 2.6, and to obtain a very good graininess particularly preferably in a range of 1.2 to 2.0.

The OD value on the recording medium for the cyan ink is preferably in a range of 2.0 to 2.7, and to obtain a very good graininess particularly preferably in a range of 2.0 to 2.5.

Moreover, the chromas $C^*_Y$, $C^*_M$ and $C^*_C$ of the yellow ink, the magenta ink and the cyan ink on the recording medium are each preferably in a range of 70 to 120, more preferably in a range of 80 to 110, yet more preferably in a range of 80 to 90.

Moreover, the hue range of the yellow ink on the recording medium is preferably such that a* is in a range of approximately −30 to approximately 20 and b* is in a range of approximately 70 to approximately 130, the hue range of the magenta ink on the recording medium is preferably such that a* is in a range of approximately 60 to approximately 90 and b* is in a range of approximately −40 to approximately −10, and the hue range of the cyan ink on the recording medium is preferably such that a* is in a range of approximately −50 to approximately −20 and b* is in a range of approximately −70 to approximately −40.

It is preferable for the lightness of each of the ink (A) and the ink (B) to be lower than the lightness of the magenta ink and the lightness of the cyan ink, and for the chroma of each of the ink (A) and the ink (B) to be higher than the chroma of the magenta ink and the chroma of the cyan ink.

Due to the definitions being as above, the chroma of high-lightness parts can be raised using the cyan, magenta and yellow inks, and the chroma of low-lightness parts can be raised through the ink (A) and/or the ink (B) being included.

Moreover, it is preferable for the lightness of the ink (A) to be lower than the lightness of the yellow ink and/or the lightness of the magenta ink. The lightness of the ink (A) on a recording medium is preferably in a range of 35 to 65, more preferably in a range of 40 to 50.

Moreover, it is preferable for the lightness of the ink (B) to be lower than the lightness of the magenta ink and/or the lightness of the cyan ink. The lightness of the ink (B) on a recording medium is preferably in a range of 5 to 65, more preferably in a range of 5 to 15.

The yellow ink preferably has an absorption spectrum with an absorption area over 400 nm to 500 nm in a range of 30 abs·nm to 350 abs·nm. The absorption area of the yellow ink over 400 nm to 500 nm is more preferably in a range of 30 abs·nm to 250 abs·nm, yet more preferably in a range of 30 abs·nm to 200 abs·nm.

The magenta ink preferably has an absorption spectrum with an absorption area over 500 nm to 600 nm in a range of 20 abs·nm to 200 abs·nm. The absorption area of the magenta ink over 500 nm to 600 nm is more preferably in a range of 20 abs·nm to 150 abs·nm, yet more preferably in a range of 20 abs·nm to 60 abs·nm.

The cyan ink preferably has an absorption spectrum with an absorption area over 600 nm to 700 nm in a range of 50 abs·nm to 400 abs·nm. The absorption area of the cyan ink over 600 nm to 700 nm is more preferably in a range of 50 abs·nm to 300 abs·nm, yet more preferably in a range of 50 abs·nm to 100 abs·nm.

The absorption area (abs·nm) in the present invention is the value obtained by totaling as an area the absorption (abs) at each wavelength (nm). For example, if the absorption in the absorption spectrum from 400 nm to 500 nm is labs, then the absorption area over 400 nm to 500 nm is 1 abs×(500−400)nm=100 abs·nm.

It is preferable for the absorption area over 500 nm to 600 nm of the ink (A) to be equal to or greater than the absorption area over 500 nm to 600 nm of the magenta ink.

The absorption area over 500 nm to 600 nm of the ink (A) is preferably in a range of 1.0 time to 3.5 times, more preferably in a range of 1.5 times to 3.0 times, the absorption area over 500 nm to 600 nm of the magenta ink.

The absorption area over 400 nm to 500 nm of the ink (A) is preferably in a range of 0.5 times to 2.0 times, more preferably in a range of 0.5 times to 1.0 time, the absorption area over 500 nm to 600 nm of the ink (A).

The absorption area over 400 nm to 500 nm of the ink (A) is preferably in a range of 40 abs·nm to 200 abs·nm, more preferably in a range of 40 abs·nm to 100 abs·nm.

The absorption area over 500 nm to 600 nm of the ink (A) is preferably in a range of 20 abs·nm to 200 abs·nm, more preferably in a range of 20 abs·nm to 150 abs·nm.

It is preferable for the absorption area over 500 nm to 600 nm of the ink (B) to be equal to or greater than the absorption area over 600 nm to 700 nm of the cyan ink.

The absorption area over 500 nm to 600 nm of the ink (B) is preferably in a range of 1.0 time to 3.0 times, more preferably in a range of 1.0 time to 2.0 times, the absorption area over 600 nm to 700 nm of the cyan ink.

The absorption area over 500 nm to 600 nm of the ink (B) is preferably in a range of 0.5 times to 5.0 times, more preferably in a range of 3.0 times to 4.0 times, the absorption area over 600 nm to 700 nm of the ink (B).

The absorption area over 500 nm to 600 nm of the ink (B) is preferably in a range of 50 abs·nm to 350 abs·nm, more preferably in a range of 50 abs·nm to 200 abs·nm.

The absorption area over 600 nm to 700 nm of the ink (B) is preferably in a range of 20 abs·nm to 150 abs·nm, more preferably in a range of 20 abs·nm to 100 abs·nm.

For each of the inks described above, the ink weight at 100% duty is preferably in a range of 10 to 20 mg/inch$^2$, more preferably in a range of 12 to 18 mg/inch$^2$, yet more preferably in a range of 14 to 16 mg/inch$^2$.

The lightness of each of the magenta ink and the cyan ink when the pigment solids concentration on the recording medium is 0.2 mg/inch$^2$ is preferably at least 45.

Inorganic pigments or organic pigments can be used as the pigments contained in the inks in the present embodiment; each can be used alone or a plurality can be used mixed together. Inorganic pigments include, for example, titanium oxide and iron oxide, and carbon black manufactured using a publicly known method such as a contact method, a furnace method or a thermal method. Moreover, organic pigments include, for example, azo pigments (including azo lake, insoluble azo pigments, condensed azo pigments, chelated azo pigments etc.), polycyclic pigments (e.g. phthalocyanine pigments, perylene pigments, perinone pigments, anthraquinone pigments, quinacridone pigments, dioxazine pigments, thioindigo pigments, isoindolinone pigments, quinophthalone pigments etc.), dye chelates (e.g. basicdye type chelates, aciddyetypechelates etc.), nitro pigments, nitroso pigments, and aniline black. Specifically, the following pigments can be given as examples.

As the pigment contained in the ink (A), it is preferable to use one or more selected from the group consisting of C.I. pigment oranges 5, 43 and 62, and C.I. pigment reds 17, 49:2, 112, 149, 177, 178, 188, 255 and 264.

Out of these, it is particularly preferable to use one or more selected from the group consisting of C.I. pigment orange 43, and C.I. pigment reds 149, 177, 178 and264. In this case, the closer the lightness of the color that can be formed from ink (A) alone is to that of the color of the same hue angle and chroma formed by mixing together only the yellow ink and the magenta ink, the more the graininess and the glossiness can be improved.

As the pigment contained in the ink (B), it is preferable to use one or more selected from the group consisting of C. I. pigment blue 60, and C.I. pigment violets 3, 19, 23, 32, 36 and 38.

Out of these, it is particularly preferable to use one or more selected from the group consisting of C.I. pigment blue 60, and C.I. pigment violets 19 and 23. In this case, the closer the lightness of the color that can be formed from ink (B) alone is to that of the color of the same hue angle and chroma formed by mixing together only the cyan ink and the magenta ink, the more the graininess and the glossiness can be improved.

As the pigment contained in the yellow ink, examples include C.I. pigment yellows 1, 2, 3, 12, 13, 14, 16, 17, 73, 74, 75, 83, 93, 95, 97, 98, 109, 110, 114, 128, 129, 138, 139, 147, 150, 151, 154, 155, 180 and 185; one or more of these can be used. Out of these, it is particularly preferable to use one or more selected from the group consisting of C.I. pigment yellows 74, 110, 128 and 147.

As the pigment contained in the magenta ink, examples include C.I. pigment reds 5, 7, 12, 48 (Ca), 48 (Mn), 57 (Ca), 57:1, 112, 122, 123, 168, 184, 202 and 209, and C.I. pigment violet 19; one or more of these can be used. Out of these, it is particularly preferable to use one or more selected from the group consisting of C.I. pigment reds 122, 202 and 209, and C.I. pigment violet 19.

As the pigment contained in the cyan ink, examples include C.I. pigment blues 1, 2, 3, 15:3, 15:4, 15:34, 16, 22 and 60, and C.I. vat blues 4 and 60; one or more of these can be used. Out of these, it is particularly preferable to use C.I. pigment blue 15:3 and/or 15:4, especially C.I. pigment blue 15:3.

The content of the pigment (in terms of solids, likewise hereinafter) in each of the ink (A) and the ink (B) is preferably in a range of 2 to 6 wt %, more preferably in a range of 2 to 4 wt %, relative to the total weight of the ink, this being from the standpoint of a balance between the printing density and the reliability as an ink for ink jet recording.

Moreover, the content of the pigment in each of the inks of the three colors yellow, magenta and cyan is preferably in a range of 0.1 to 2 wt %, more preferably in a range of 1.5 to 2 wt %, relative to the total weight of the ink, this being from the standpoint of the glossiness and the chroma.

Moreover, in the present invention, as another preferable embodiment, from the standpoint of improving the dot visibility (graininess) on a recording medium especially for ink jet recording having an ink-absorbing layer, the content of the pigment in each of the magenta ink and the cyan ink is no more than 2 wt %, preferably in a range of 0.1 to 2 wt %, particularly preferably in a range of 1.5 to 2 wt %, and the content of the pigment in each of the ink (A), the ink (B) and the yellow ink is at least 2 wt %, preferably in a range of 2 to 6 wt %, particularly preferably in a range of 2 to 4 wt %.

Moreover, in the present invention, as yet another preferable embodiment, from the standpoint of the coloring ability and broadening the color reproduction range on regular paper, the content of the pigment in each of the yellow ink, the magenta ink, the cyan ink, and ink (A) and the ink (B) is at least 2 wt %.

The ink set of the present embodiment comprises inks of the three colors yellow, magenta and cyan, and special inks of two colors as described above, but a black ink can be further added as necessary. Examples of the pigment contained in the black ink include inorganic pigments such as carbon blacks such as furnace black, lamp black, acetylene black and channel black (C.I. pigment black 7), and iron oxide pigments; and organic pigments such as aniline black (C.I. pigment black 1). It is particularly preferable to use a carbon black, with examples of preferable carbon blacks including No. 2300, No. 900, MCF88, No. 33, No. 40, No. 52, MA7, MA8, MA100, No. 2200B and so on made by Mitsubishi Chemical Corporation, Raven 5750, Raven 5250, Raven 5000, Raven 3500, Raven 1255, Raven 700 and so on made by Columbian Chemicals Company, Regal 400R, Regal 1660R, Mogul 1, Monarch 700, Monarch 800, Monarch 880, Monarch 900, Monarch 1000, Monarch 1100, Monarch 1300, Monarch 1400 and so on made by Cabot Corporation, and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and so on made by Degussa Corporation.

The content of the pigment in the black ink is preferably in a range of 0.1 to 4 wt %, more preferably in a range of 1 to 3 wt %.

From the standpoint of improving the dispersion stability of the pigment, it is preferable to include a dispersant in the inks in the present embodiment. A dispersant commonly used in this kind of pigment ink can be used, with there being no particular limitations; examples include cationic, anionic and nonionic dispersants and surfactants. Examples of anionic dispersants include polyacrylic acid, polymethacrylic acid, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methyl styrene-acrylic acid copolymers, styrene-α-methyl styrene-acrylic acid-acrylic acid alkyl ester copolymers, styrene-maleic acid copolymers, vinylnaphthalene-maleic acid copolymers, vinyl acetate-ethylene copolymers, vinyl acetate-fatty acid vinyl-ethylene copolymers, vinyl acetate-maleic acid ester copolymers, vinyl acetate-crotonic acid copolymers, and vinyl acetate-acrylic acid copolymers. Moreover, examples of anionic surfactants include sodium dodecylbenzenesulfonate, sodium laurate, and ammonium salts of polyoxyethylene alkylether sulfates; examples of nonionic surfactants include polyoxyethylene alkyl ethers, polyoxyethylene alkyl esters, polyoxyethyiene sorbitan fatty acid esters, polyoxyethylene alkyl phenyl ethers, polyoxyethylene alkylamines, and polyoxyethylene alkylamides; one or more of these can be used. It is particularly preferable to use a styrene-(meth) acrylic acid copolymer.

The content of the dispersant in the ink is preferably in a range of 0.1 to 10 wt %, more preferably in a range of 0.3 to 6 wt %, relative to the pigment in terms of solids.

Moreover, from the standpoint of preventing drying up of the inks and thus preventing clogging of the ink jet printer head, a high-boiling-point organic solvent can be included in the inks in the present embodiment. Examples of high-boiling-point organic solvents include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerol, trimethylol ethane, and trimethylol propane; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, and triethanolamine; and saccharides such as sugar alcohols; one or more of these can be used.

The content of the high-boiling-point organic solvent in the ink is preferably in a range of 0.1 to 30 wt %, more preferably in a range of 0.5 to 20 wt %.

Moreover, from the standpoint of shortening the drying time of the inks, a low-boiling-point organic solvent can be included in the inks in the present embodiment. Examples of low-boiling-point organic solvents include methanol, ethanol, n-propyl alcohol, isopropyl alcohol, n-butanol, sec-butanol, tert-butanol, isobutanol, and n-pentanol; one or more of these can be used. A monohydric alcohol is particularly preferable.

Moreover, from the standpoint of raising the wettability to the recording medium and thus raising the penetrability, a penetration promoter can be included in the inks in the present embodiment. Examples of penetration promoters include various surfactants such as anionic surfactants, cationic surfactants, and amphoteric surfactants; alcohols such as methanol, ethanol, and isopropyl alcohol; polyhydric alcohol lower alkyl ethers such as ethylene glycolmonomethyl ether, diethylene glycolmonoethyl ether, diethylene glycol monobutyl ether, triethylene glycol monobutyl ether, propylene glycol monobutyl ether, and dipropylene glycol monobutyl ether; and diols such as 1,2-pentanediol and 1,2-hexanediol; one or more of these can be used. It is particularly preferable to use diethylene glycol monobutyl ether, triethylene glycol monobutyl ether, or 1,2-hexanediol.

The content of the penetration promoter in the ink is preferably in a range of 1 to 20 wt %, more preferably in a range of 1 to 10 wt %.

An acetylene glycol type compound as represented by undermentioned general formula (I) or a polysiloxane type compound can also be used as a penetration promoter. As an acetylene glycol type compound, a commercially sold one can be used, with examples including Olfine Y, Surfinol 82, 440, 465 and 485, STG and E1010 (all trade names, made by Air Products and Chemicals Inc.); one or more of these can be used. It is particularly preferable to use Surfinol 465. Moreover, as a polysiloxane type compound, a commercially sold one such as BYK348 (made by BYK Chemie Japan) can be used. The content of the acetylene glycol type compound and/or the polysiloxane type compound in the ink is preferably in a range of 0.1 to 5 wt %, more preferably in a range of 0.5 to 2 wt %.

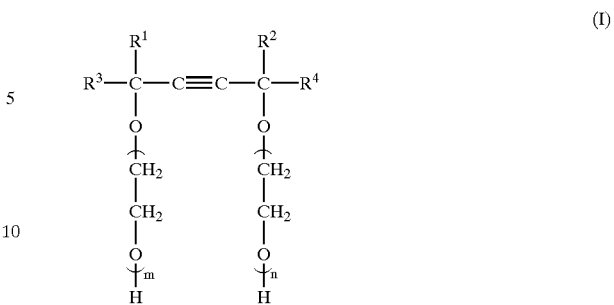

(In the formula, $0 \leq m+n \leq 50$, and each of R1 to R4 independently represents an alkyl group having 1 to 6 carbon atoms.)

In addition to the pigments described above, dispersants, high-boiling point organic solvents, low-boiling point organic solvents and penetration promoters can be included in the inks in the present embodiment as necessary, with water being included as the balance. It is preferable to use pure water or ultra-pure water, for example ion exchange water, ultra-filtration water, reverse osmosis water or distilled water, as the water. Inparticular, such water that has been sterilized by irradiating with ultraviolet rays, adding hydrogen peroxide or the like is preferable, since then mold and bacteria can be prevented from arising over a prolonged period.

Additives, for example fixing agents such as water-soluble rosins, fungicides/preservatives such as sodium benzoate, antioxidants/ultraviolet absorbers such as allophanates, chelating agents, oxygen absorbers, and pH regulators, can also be included in the inks in the present embodiment as necessary; one or more of these can be used.

The inks in the present embodiment can be prepared as with conventional pigment inks, using a conventional publicly-known apparatus such as a ball mill, a sand mill, an attritor, a basket mill or a roll mill. During the preparation, it is preferable to eliminate coarse particles using a membrane filter, a mesh filter or the like.

The reaction liquid in the present embodiment contains water and a reactant that is capable of breaking down the dispersed and/or dissolved state of the pigments in the inks, thus bringing about agglomeration. Water like that used in the inks as described above can be used as the water. Moreover, one or more selected from the group consisting of polyvalent metal salts, polyallylamine and derivatives thereof, polyacrylamide and derivatives thereof, and polyethylenimine can be used as the reactant.

The above-mentioned polyvalent metal salts (reactants) are constituted from polyvalent metal ions of valency two or above, and negative ions that bind to the polyvalent metal ions; it is preferable to use a polyvalent metal salt that is soluble in water.

Examples of polyvalent metal ions of valency two or above include bivalent ions such as $Ca^{2+}$, $Cu^{2+}$, $Ni^{2+}$, $Mg^{2+}$, $Zn^{2+}$ and $Ba^{2+}$, and trivalent ions such as $Al^{3+}$, $Fe^{3+}$ and $Cr^{3+}$. In particular, a polyvalent metal salt having $Ca^{2+}$ or $Mg^{2+}$ as the polyvalent metal ions of valency two or above gives good results, this being from the standpoint of both the pH of the reaction liquid and the quality of the printed article obtained.

Moreover, examples of the negative ions include $Cl^-$, $NO^{3-}$, $I^-$, $Br^-$, $ClO_3^-$, and $RCOO^-$. Nitrate ions ($NO_3^-$) or carboxylate ions ($RCOO^-$) are particularly preferable.

The above-mentioned carboxylate ions are preferably ones derived from one or more carboxylic acids selected from the group consisting of saturated aliphatic monocarboxylic acids having 1 to 6 carbon atoms and cyclic monocarboxylic acids having 6 to 10 carbon atoms.

Preferable examples of saturated aliphatic monocarboxylic acids having 1 to 6 carbon atoms include formic acid, acetic acid, propionic acid, butyric acid, isobutyric acid, valeric acid, isovaleric acid, pivalic acid, and hexanoic acid. Formic acid and acetic acid are particularly preferable. A hydrogen atom of the saturated aliphatic hydrocarbon group of the saturated aliphatic monocarboxylic acid having 1 to 6 carbon atoms may be substituted with a hydroxyl group, with a preferable example of such a carboxylic acid being lactic acid.

Moreover, preferable examples of cyclic monocarboxylic acids having 6 to 10 carbon atoms include benzoic acid and naphthoic acid, with benzoic acid being particularly preferable.

The content of the polyvalent metal salt may be determined as appropriate from within a range such that good printing quality and a clogging prevention effect can be obtained, but is preferably about 0.1 to 40 wt %, more preferably about 5 to 25 wt %, of the reaction liquid.

Moreover, the above-mentioned polyallylamine and derivatives thereof (reactants) are all cationic macromolecules that are soluble in water and are positively charged in water. Examples of the polyallylamine and derivatives thereof include polymers represented by undermentioned general formulae (a) to (c); a polymer obtained by copolymerizing allylamine and diallylamine; and a copolymer between diallylmethyl ammonium Chloride and sulfur dioxide.

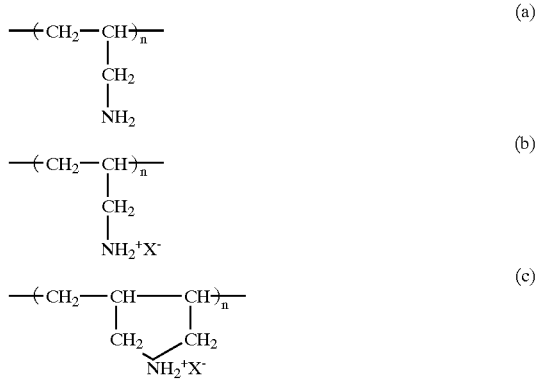

The content of the polyallyamine and derivatives thereof is preferably in a range of 0.5 to 10 wt % of the reaction liquid.

Moreover, as the above-mentioned polyacrylamide and derivatives thereof (reactants), any ones can be used, for example nonionic type, anionic type, cationic type or cationic ester type. Specific examples include polyacrylamides (nonionic type) represented by undermentioned general formula (d), polyacrylamides (anionic type) represented by undermentioned general formula (e), sodium polyacrylates (anionic type) represented by undermentioned general formula (f), polyacrylamides (cationic ester type) represented by undermentioned general formula (g), and other polymers such as polyacrylic acid ester type polymers and polymethacrylic acid type polymers.

[—CH$_2$CH(CONH$_2$)—]n (d)

[—CH$_2$CH(CONH$_2$)—]n.[—CH$_2$CH(COONa)—]m (e)

[—CH$_2$CH(COONa)—]n (f)

[—CH$_2$CH(CONH$_2$)—]n.[—CH$_2$CH(COOCH$_2$CH$_2$N(CH$_3$)$_2$)—]m (g)

The content of the polyacrylamide and derivatives thereof in the reaction liquid in the present invention is preferably about 0.05 to 5 wt % of the reaction liquid.

Moreover, as the above-mentioned polyethylenimine (reactant), a synthesized one or a commercially sold one can be used; from the perspective of reactivity, it is particularly preferable to use a branched one. Examples include branched ones commercially sold by Aldrich.

The average molecular weight (Mn: number average molecular weight) of the polyethylenimine is preferably no more than 10000, more preferably in a range of 500 to 2000.

The content of the polyethylenimine in the reaction liquid in the present invention is preferably in a range of 0.1 to 10 wt %, more preferably in a range of 0.3 to 5 wt %.

From the standpoint of preventing drying up of the reaction liquid and thus preventing clogging of the ink jet printer head, it is preferable to include a high-boiling-point organic solvent as a wetting agent in the reaction liquid in the present embodiment. As this high-boiling-point organic solvent, ones like those that can be used in the inks as described earlier can be used. There are no particular limitations on the content of the high-boiling-point organic solvent, but this content is preferably about 0.5 to 40 wt %, more preferably about 2 to 20 wt %.

A low-boiling-point organic solvent and/or a penetration promoter can be included in the reaction liquid in the present embodiment as necessary. As the low-boiling-point organic solvent and the penetration promoter, ones like those that can be used in the inks as described earlier can be used. Moreover, to improve the storage stability, pH regulators, fungicides/preservatives and so on may also be included in the reaction liquid in the present embodiment as necessary.

It is preferable to use the ink set of the present embodiment with an ink jet recording method in which ink droplets are discharged from nozzles and attached to a recording medium, thus forming characters and/or images; in particular, it is preferable to use the ink set of the present embodiment with an on-demand type ink jet recording method. Examples of on-demand type ink jet recording methods include, for example, a piezoelectric element recording method in which recording is carried out using piezoelectric elements arranged on a printer head, and a thermal jet recording method in which recording is carried out using thermal energy from heat-generating resistive element heaters or the like arranged on a printer head; the ink set of the present embodiment can be suitably used with either of these ink jet recording methods.

Because the ink set of the present embodiment contains special inks of two colors, that is the ink (A) and the ink (B), which are not present in conventional two-liquid (inks plus reaction liquid) ink sets for ink jet recording, the color reproduction range is broad. According to the ink set of the present embodiment, mixed color parts that could only be produced using inks of two or more colors with a conventional ink set of this kind can thus be formed using only the special inks, or using an ink firing amount lower than in the case that the mixed color parts are formed using two or more conventional inks, and can be formed by carrying out color mixing (as described later) between the special inks and the other inks. With the ink set of the present embodiment, a high-quality printed article can thus be provided for which the color density is high, there is little blotting or unevenness, and there is no occurrence of problems such as deformation of the recording medium such as wrinkling or coloring passing through to the rear side of the paper, which have been drawbacks with conventional two-liquid ink sets for ink jet recording due to a large amount of water-based liquid being fired onto the recording medium (especially in the case of regular paper).

Next, the ink jet recording method of the present invention will be described through a preferable embodiment thereof in which an ink set as described above is used.

The ink jet recording method of the present embodiment is an ink jet recording method of forming characters and/or images on a recording medium using an ink set as described above comprising the inks of the four colors yellow, magenta, cyan and black, and the reaction liquid, wherein droplets of the inks and the reaction liquid are discharged such that the inks and the reaction liquid come into contact with one another on the recording medium, and in the case of forming mixed color parts of one or more colors on the recording medium by mixing droplets of a plurality of the inks on the recording medium, at least one of the inks other than the ink (A) and the ink (B), and the ink (A) and/or the ink (B) are used.

That is, the ink jet recording method of the present embodiment is characterized in that, in the case of the so-called two-liquid (inks plus reaction liquid) ink jet recording method, when forming mixed color parts, the ink (A) and/or the ink (B) is/are used; when firing ink of a single color onto the recording medium, the method is as with a regular ink jet recording method.

FIG. 1 is a perspective view of main parts of an ink jet recording apparatus for implementing the ink jet recording method of the present embodiment. This ink jet recording apparatus is of a form in which the inks and the reaction liquid are stored in an ink tank, and are fed to a recording head via an ink tube. That is, the recording head 1 and the ink tank 2 are communicated together by an ink tube 3. The inside of the ink tank 2 is partitioned, with chambers for the inks of the 4 colors and a chamber for the reaction liquid being provided.

The recording head 1 is moved on a carriage 4 by a timing belt 6 driven by a motor 5. A recording medium 7 is placed in a position facing the recording head 1 using a platen 8 and a guide 9. Note that this embodiment includes a cap 10. A suction pump 11 is joined to the cap 10, and carries out a so-called cleaning operation. The ink sucked out passes through a tube 12 and is collected in a waste ink bank 13.

Figure 2:
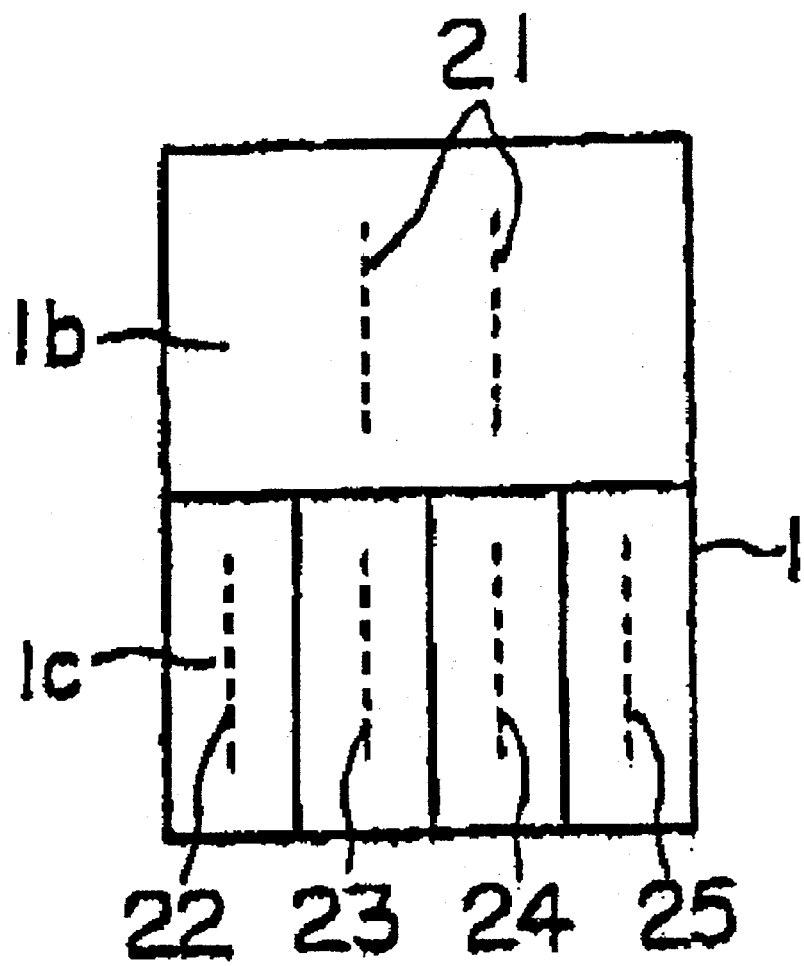
FIG. 2 is an enlarged view of nozzle surfaces of a recording head of the ink jet recording apparatus of FIG. 1.

An enlarged view of nozzle surfaces of the recording head 1 is shown in FIG. 2. The part represented by '1b' is the nozzle surface for the reaction liquid, and has provided therein in a longitudinal direction nozzles 21 from which the reaction liquid is discharged. The part represented by '1c', on the other hand, is the nozzle surface for the inks, and the yellow ink, the magenta ink, the cyan ink and the black ink are discharged from nozzles 22, 23, 24 and 25 respectively.

By operating the ink jet recording apparatus having this constitution as conventionally, droplets of the inks and the reaction liquid are discharged such that the inks and the reaction liquid come into contact with one another on the recording medium 7, while the recording head 1 is swept along on the carriage 4. The reaction liquid may be attached to the recording medium selectively only in places where ink is to be attached, or may be attached over the whole of the surface being recorded upon. In the former case, the consumption of the reaction liquid can be kept down to the minimum required, which is economical, but a certain degree of precision is required in the positions of attachment of both the reaction liquid and the inks. In the latter case, on the other hand, the requirements on the precision of the positions of attachment of the reaction liquid and the inks are relaxed.

Ink jet recording using the ink jet recording apparatus described above will now be described with reference to FIG. 3. First, while the recording head 1 is moving from the left edge to the right edge of the recording medium 7 in the direction of the arrow A, the reaction liquid is discharged from the nozzle surface 1b, thus forming a band-shaped reaction-liquid-attached region 31 on the recording medium 7. Once the recording head 1 reaches the right edge of the recording medium 7, the recording medium 7 is transported by a prescribed amount in a paper feeding direction (arrow B), and the recording head 1 is moved in the opposite direction to the direction of the arrow A, thus returning to the left edge of the recording medium 7. Then, while the recording head 1 is once again moving from the left edge to the right edge of the recording medium 7 in the direction of the arrow A, the inks are discharged from the nozzle surface 1c in correspondence with the reaction-liquid-attached region 31, thus forming a printed region 32.

When the printed region 32 is formed, in the case that ink of a single color is fired out, droplets of the ink of the respective color are discharged as in a regular ink jet recording method, but in the case of forming mixed color parts, at least one of the inks other than the ink (A) and the ink (B), and the ink (A) and/or the ink (B) are used, and the desired mixed color part is formed by mixing droplets of these inks together on top of the reaction-liquid-attached region 31.

Specifically, in the case of forming mixed color parts for which the perceived chromaticity indices $a^*$ and $b^*$ are in ranges of approximately −40 to approximately 90 and approximately −40 to approximately 100 respectively, i.e. mixed color parts of a color having a hue between yellow and magenta (for example, orange or red), at least the inks of the two colors yellow and magenta, and the ink (A) are used. In this case, the ink firing amount of the ink (A) per unit area is preferably in a range of 10 to 90 wt %, more preferably in a range of 30 to 50 wt %, of the total firing amount of the inks used in forming the mixed color part.

Moreover, in the case of forming mixed color parts for which the perceived chromaticity indices $a^*$ and $b^*$ are in ranges of approximately −50 to approximately 100 and approximately −10 to approximately −80 respectively, i.e. mixed color parts of a color having a hue between magenta and cyan (for example, violet), at least the inks of the two colors magenta and cyan, and the ink (B) are used. In this case, the ink firing amount of the ink (B) per unit area is preferably in a range of 10 to 90 wt %, more preferably in a range of 30 to 50 wt %, of the total firing amount of the inks used in forming the mixed color part.

Figure 3:
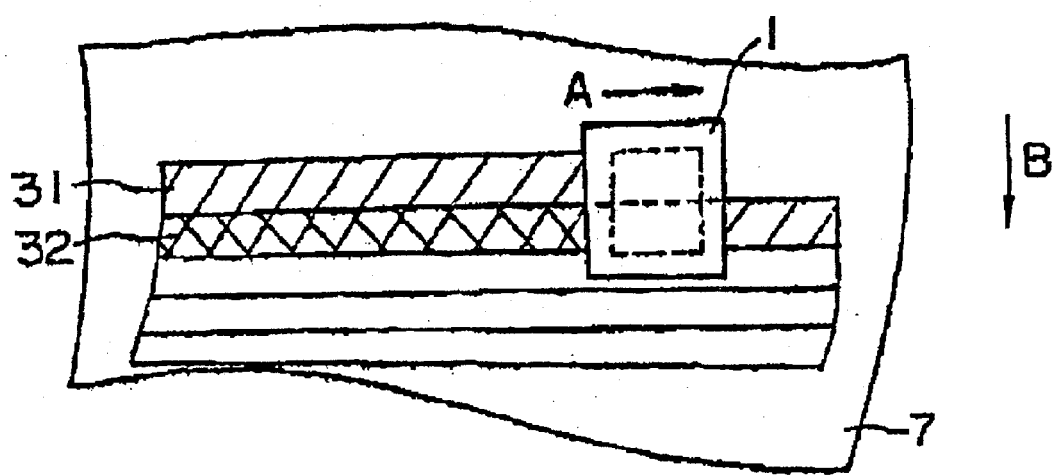
FIG. 3 is an explanatory view of ink jet recording using the recording head of FIG. 2.

The inks are discharged on top of the reaction-liquid-attached region 31 to form the printed region 32 in this way, and once the recording head 1 reaches the right edge of the recording medium 7 in FIG. 3, the recording medium 7 is transported by a prescribed amount in the paper feeding direction (arrow B), and the recording head 1 is moved in the opposite direction to the direction of the arrow A, thus returning to the left edge of the recording medium 7 in FIG. 3. By repeating this sequence of operations using the recording head 1, prescribed characters and/or images are formed on the recording medium 7, thus producing a printed article.

Because an agglomerate formed through the reaction liquid and the inks coming into contact with one another is attached onto the recording medium, the printed article obtained in this way is a high-quality printed article for which the color density is high, and there is little unevenness or blotting such as so-called color bleeding in which there is uneven color mixing at the boundaries between different colors, even if regular paper is used as the recording medium.

With the ink jet recording method of the present embodiment, recording media commonly used with this kind of recording method can be used with there being no particular limitations, although the ink jet recording method of the present embodiment is particularly effective with regular paper (a recording medium in which the fibers are exposed at the recording surface), for which problems such as wrinkling are prone to being caused by firing a large amount of water-based liquid. That is, according to the ink jet recording method of the present embodiment, by using an ink set that contains special inks of two colors, i.e. the ink (A) and the ink (B), and has a broad color reproduction range, and using the special inks when forming mixed color parts, highly colored characters and/or images can be formed with an ink firing amount lower than with a conventional two-liquid (inks plus reaction liquid) ink jet recording method, and hence, even if regular paper is used as the recording medium, deformation of the regular paper and coloring passing through to the rear side can be suppressed, and thus a high-quality printed article can be provided.

The ink jet recording apparatus used to implement the ink jet recording method of the present embodiment is not limited to having the constitution described above.

Figure 4:
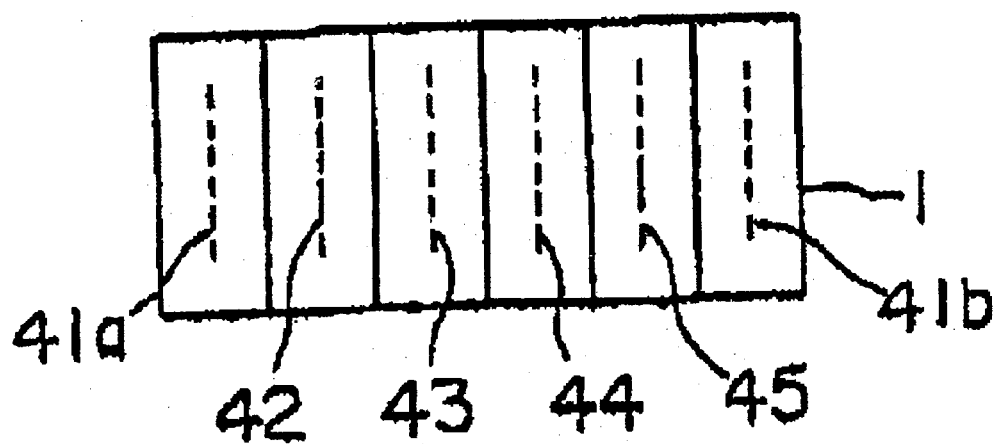
FIG. 4 is an enlarged view of nozzle surfaces of another form of the recording head of the ink jet recording apparatus of FIG. 1.

For example, the ink jet recording method of the present embodiment can be implemented even if the nozzle surface constitution of the recording head 1 in the ink jet recording apparatus is such that all of the nozzles are lined up in the transverse direction as shown in FIG. 4. In FIGS. 4, 41a and 41b are discharge nozzles for the reaction liquid, and the yellow ink, the magenta ink, the cyan ink and the black ink are discharged from nozzles 42, 43, 44 and 45 respectively. With a recording head having such a form, printing can be carried out both while the carriage is traveling outwards and while the carriage is traveling back, and hence printing can be carried out faster than in the case that the recording head shown in FIG. 2 is used. Moreover, in the case of the recording head 1 shown in FIG. 4, if the surface tension of each of the inks and the reaction liquid is suitably adjusted, then it is possible to use only one discharge nozzle for the reaction liquid (e.g. in FIG. 4, the nozzle 41b can be omitted), thus further miniaturizing the head and further increasing the printing speed.

Figure 5:
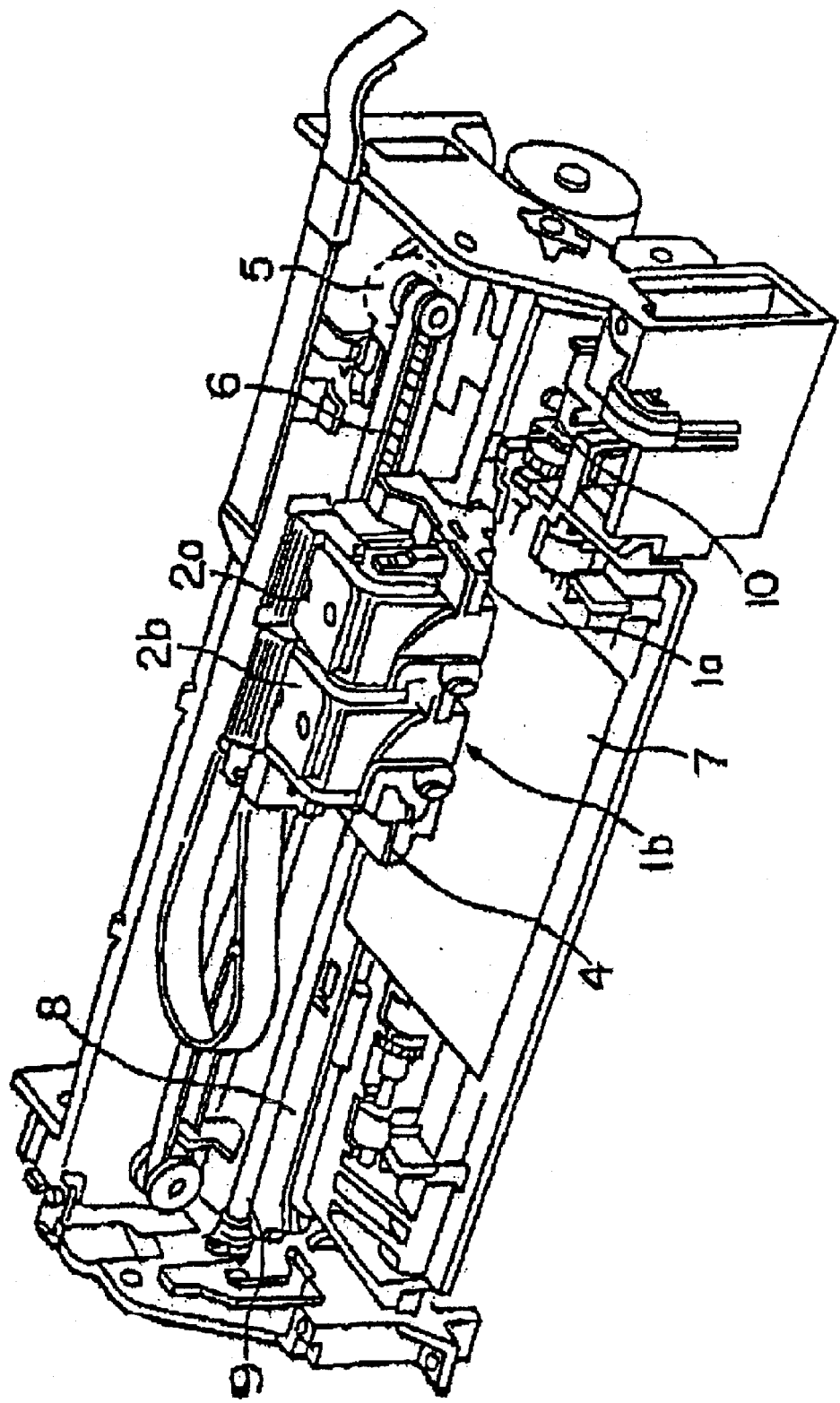
FIG. 5 is a perspective view of main parts of another form of the ink jet recording apparatus for implementing the ink jet recording method of the present embodiment.

Moreover, the ink jet recording method-of the present embodiment can be implemented not only with an ink jet recording apparatus having a constitution in which the ink tank and the recording head are separated as described above, but also with an ink jet recording apparatus having a constitution in which ink tanks and recording heads are integrated together as shown in FIG. 5. In FIG. 5, members the same as ones in the apparatus of FIG. 1 are given the same reference numerals as in FIG. 1. In the form of FIG. 5, recording heads 1a and 1b are integrated with ink tanks 2a and 2b respectively, and the inks are discharged from the recording head 1a, while the reaction liquid is discharged from the recording head 1b. The printing method may be basically the same as that of the apparatus of FIG. 1. In this form, the recording head 1a and the ink bank 2a, and the recording head 1b and the ink bank 2b, move together on the carriage 4.

The present invention is not limited to the embodiments described above, but rather various modifications are possible provided that the purport of the present invention is not deviated from.

The ink set of the present invention should contain the reaction liquid, the inks of the three colors yellow, magenta and cyan each having a hue angle ∠H° as defined in CIELAB color space on a recording medium within a specified range as described earlier, and special inks of two colors, that is the ink (A) and the ink (B); however, in addition to these inks, the ink set may also contain, for example, a black ink as described earlier, and one or more of a yellow ink, a magenta ink and a cyan ink other than the yellow ink, the magenta ink and the cyan ink according to the present invention.

Moreover, in the embodiments described above, the ink set of the present invention was described by taking a pigment ink set as an example, but the coloring agents are not limited to being pigments.

Moreover, with the ink jet recording method of the present invention, in the case of forming mixed color parts of one or more colors on the recording medium by mixing droplets of a plurality of the inks on the recording medium, at least one of the inks other than the ink (A) and the ink (B), and the ink (A) and/or the ink (B) should be used; however, the combination of inks used when forming the mixed color parts is not limited to being as in the embodiments described above.

Moreover, the ink jet recording method of the present invention is not limited to the form in which droplets of the reaction liquid are first discharged and then droplets of the inks are discharged to form characters and/or images on the recording medium as in the embodiments described above, but rather may also be of the form in which droplets of the inks are first discharged to form characters and/or images on the recording medium and then droplets of the reaction liquid are discharged.

Moreover, in the embodiments described above, the ink jet recording method of the present invention was described by taking an ink set comprising pigment inks of 4 colors as an example; however, there is no limitation to this ink set, but rather, regarding the types of the inks, the ink jet recording apparatus used and so on, various modifications can be made provided that the purport of the present invention is not deviated from.

EXAMPLES

Working examples and experimental examples for the present invention are given below, thus describing the present invention in more detail. However, the present invention is not limited whatsoever by these working examples.

Working Example 1

Pigment inks of the 6 colors black, cyan, magenta, yellow, orange (ink (A)) and violet (ink (B)) having the undermentioned compositions were prepared as described below in 'Preparation of inks'. Moreover, a reaction liquid 1 having the undermentioned composition was also prepared. The pigment inks of the 6 colors and the reaction liquid 1 were combined to form an ink set 1.

<Preparation of Inks>

The pigment, the dispersant and the water were mixed together to make a mixture, dispersion was carried out for 2 hours in a sand mill (made by Yasukawa Seisakusho) with glass beads (diameter 1.7 mm) in an amount 1.5 times the amount (weight) of the mixture, and then the glass beads were removed, thus obtaining a pigment dispersion. Next, the components in the undermentioned composition other than the pigment and the dispersant (i.e. the solvents and additives) were mixed together and dissolved to prepare an ink solvent, the ink solvent was instilled gradually into the pigment dispersion while stirring the pigment dispersion, and then stirring was carried out for 20 minutes at normal temperature. Filtration was then carried out using a 5 μm membrane filter, thus obtaining a pigment ink for ink jet recording.

<Black ink>

| | |
|---|---|
| Carbon black MA7 (made by Mitsubishi Chemical Corporation) | 5.0 wt % |
| Styrene - acrylic acid copolymer (dispersant) | 1.0 wt % |
| Triethylene glycol monobutyl ether | 10.0 wt % |
| Glycerol | 10.0 wt % |
| Ion exchange water | Remainder |
| Total | 100.0 wt % |

<Cyan ink>

| | |
|---|---|
| C.I. pigment blue 15:3 | 1.5 wt % |
| Styrene - acrylic acid copolymer (dispersant) | 1.0 wt % |
| Triethylene glycol monobutyl ether | 10.0 wt % |
| Diethylene glycol | 10.0 wt % |
| Ion exchange water | Remainder |
| Total | 100.0 wt % |

<Magenta ink>

| | |
|---|---|
| C.I. pigment red 122 | 2.0 wt % |
| Styrene - acrylic acid copolymer (dispersant) | 1.0 wt % |
| Triethylene glycol monobutyl ether | 10.0 wt % |
| Glycerol | 5.0 wt % |
| Diethylene glycol | 5.0 wt % |
| Ion exchange water | Remainder |
| Total | 100.0 wt % |

<Yellow ink>

| | |
|---|---|
| C.I. pigment yellow 128 | 2.0 wt % |
| Styrene - acrylic acid copolymer (dispersant) | 1.0 wt % |
| Triethylene glycol monobutyl ether | 10.0 wt % |
| Glycerol | 8.0 wt % |
| Ion exchange water | Remainder |
| Total | 100.0 wt % |

<Orange ink (ink (A))>

| | |
|---|---|
| C.I. pigment orange 43 | 2.0 wt % |
| Styrene - acrylic acid copolymer (dispersant) | 1.0 wt % |
| Triethylene glycol monobutyl ether | 10.0 wt % |
| Diethylene glycol | 10.0 wt % |
| Ion exchange water | Remainder |
| Total | 100.0 wt % |

<Violet ink (ink (B))>

| | |
|---|---|
| C.I. pigment violet 23 | 2.0 wt % |
| Styrene - acrylic acid copolymer (dispersant) | 1.0 wt % |
| Triethylene glycol monobutyl ether | 10.0 wt % |
| Glycerol | 5.0 wt % |
| Diethylene glycol | 5.0 wt % |
| Ion exchange water | Remainder |
| Total | 100.0 wt % |

<Reaction liquid 1>

| | |
|---|---|
| Magnesium nitrate hexahydrate | 25.0 wt % |
| Triethylene glycol monobutyl ether | 10.0 wt % |
| Glycerol | 8.0 wt % |
| Ion exchange water | Remainder |
| Total | 100.0 wt % |

Working Example 2

An inkset 2 was obtained having the same constitution as the ink set 1 (Working Example 1), except that undermentioned reaction liquid 2 was used instead of the reaction liquid 1.

<Reaction liquid 2>

| | |
|---|---|
| Polyallylamine PAA-10C (resin component 10%, made by Nitto Boseki Co., Ltd.) | 30.0 wt % |
| Triethylene glycol monobutyl ether | 10.0 wt % |
| Glycerol | 8.0 wt % |
| Ion exchange water | Remainder |
| Total | 100.0 wt % |

Working Example 3

An ink set 3 was obtained having the same constitution as the ink set 1 (Working Example 1), except that undermentioned reaction liquid 3 was used instead of the reaction liquid 1.

<Reaction liquid 3>

| | |
|---|---|
| Polyacrylamide A-101 (made by Toagosei Co., Ltd.) | 0.1 wt % |
| Triethylene glycol monobutyl ether | 10.0 wt % |
| Glycerol | 10.0 wt % |
| Ion exchange water | Remainder |
| Total | 100.0 wt % |

Working Example 4

An ink set 4 was obtained having the same constitution as the ink set 1 (Working Example 1), except that undermentioned reaction liquid 4 was used instead of the reaction liquid 1.

<Reaction liquid 4>

| | |
|---|---|
| Polyacrylamide N-207 (made by Toagosei Co., Ltd.) | 0.05 wt % |
| Triethylene glycol monobutyl ether | 10.0 wt % |
| Glycerol | 10.0 wt % |
| Ion exchange water | Remainder |
| Total | 100.0 wt % |

Working Example 5

An ink set 5 was obtained having the same constitution as the ink set 1 (Working Example 1), except that undermentioned reaction liquid 5 was used instead of the reaction liquid 1.

<Reaction liquid 5>

| | |
|---|---|
| Polyacrylic acid ester C-502 (made by Toagosei Co., Ltd.) | 0.1 wt % |

-continued

| <Reaction liquid 5> | |
|---|---|
| Triethylene glycol monobutyl ether | 10.0 wt % |
| Glycerol | 10.0 wt % |
| Ion exchange water | Remainder |
| Total | 100.0 wt % |

Working Example 6

An ink set 6 was obtained having the same constitution as the ink set 1 (Working Example 1), except that undermentioned reaction liquid 6 was used instead of the reaction liquid 1.

| <Reaction liquid 6> | |
|---|---|
| Polyethylenimine (made by Aldrich, branched type, Mn = 800) | 2.5 wt % |
| Triethylene glycol monobutyl ether | 10.0 wt % |
| Glycerol | 10.0 wt % |
| Ion exchange water | Remainder |
| Total | 100.0 wt % |

Comparative Example 1

Pigment inks of the 4 colors black, cyan, magenta and yellow having the undermentioned compositions were prepared as described earlier in 'Preparation of inks'. The pigment inks of the 4 colors and the reaction liquid 1 described earlier were combined to form an ink set 7.

| <Black ink> | |
|---|---|
| C.I. pigment black 1 | 5.0 wt % |
| Styrene - acrylic acid copolymer (dispersant) | 1.0 wt % |
| Triethylene glycol monobutyl ether | 10.0 wt % |
| Glycerol | 10.0 wt % |
| Ion exchange water | Remainder |
| Total | 100.0 wt % |
| <Cyan ink> | |
| Pigment KET BLUE EX-1 (made by Dainippon Ink and Chemicals, Inc.) | 1.5 wt % |
| Styrene - acrylic acid copolymer (dispersant) | 1.0 wt % |
| Triethylene glycol monobutyl ether | 10.0 wt % |
| Diethylene glycol | 10.0 wt % |
| Ion exchange water | Remainder |
| Total | 100.0 wt % |
| <Magenta ink> | |
| Pigment KET RED 309 (made by Dainippon Ink and Chemicals, Inc.) | 2.0 wt % |
| Styrene - acrylic acid copolymer (dispersant) | 1.0 wt % |
| Triethylene glycol monobutyl ether | 10.0 wt % |
| Glycerol | 5.0 wt % |
| Diethylene glycol | 5.0 wt % |
| Ion exchange water | Remainder |
| Total | 100.0 wt % |
| <Yellow ink> | |
| Pigment KET YELLOW 403 (made by Dainippon Ink and Chemicals, Inc.) | 2.0 wt % |
| Styrene - acrylic acid copolymer (dispersant) | 1.0 wt % |

-continued

| Triethylene glycol monobutyl ether | 10.0 wt % |
|---|---|
| Glycerol | 8.0 wt % |
| Ion exchange water | Remainder |
| Total | 100.0 wt % |

Comparative Example 2

An ink set 8 was obtained having the same constitution as the ink set 7 (Comparative Example 1), except that the reaction liquid 1 was omitted.

Experimental Examples (Production of Printed Articles and Measurement of Colors etc. Thereof)

Printing was carried out with the ink set 1 at 1440×720 dpi and 100% duty on PM photographic paper (made by Seiko Epson Corporation) using an ink jet printer (trade name 'MC-2000', made by Seiko Epson Corporation) having an integrated type recording head with a nozzle constitution as shown in FIG. 4, thus producing printed articles. The 'duty' refers to the value D that is defined and calculated as in undermentioned formula (A). 100% duty implies the maximum weight of ink of a single color for the pixels.

$$D=\{\text{Actual no. dots printed}/(\text{vertical resolution}\times\text{horizontal resolution})\}\times 100(\text{duty}) \quad (A)$$

The optical density (OD) of each of the printed articles obtained in this way was measured using an 'SPM-50' made by Gretag with a DG5 light source and an field angle of 2°, and $L^*$, $a^*$ and $b^*$ as defined in CIELAB color space, and also the hue angle $\angle H°$ ($\angle H°=\tan^{-1}(b^*/a^*)+180°$ in the case that $a^*<0$, and $\angle H°=\tan^{-1}(b^*/a^*)+360°$ in the case that $a^*>0$) and the chroma $C^*(=\{(a^*)^2+(b^*)^2\}^{1/2})$, were determined for each of the printed articles.

Figure 6:
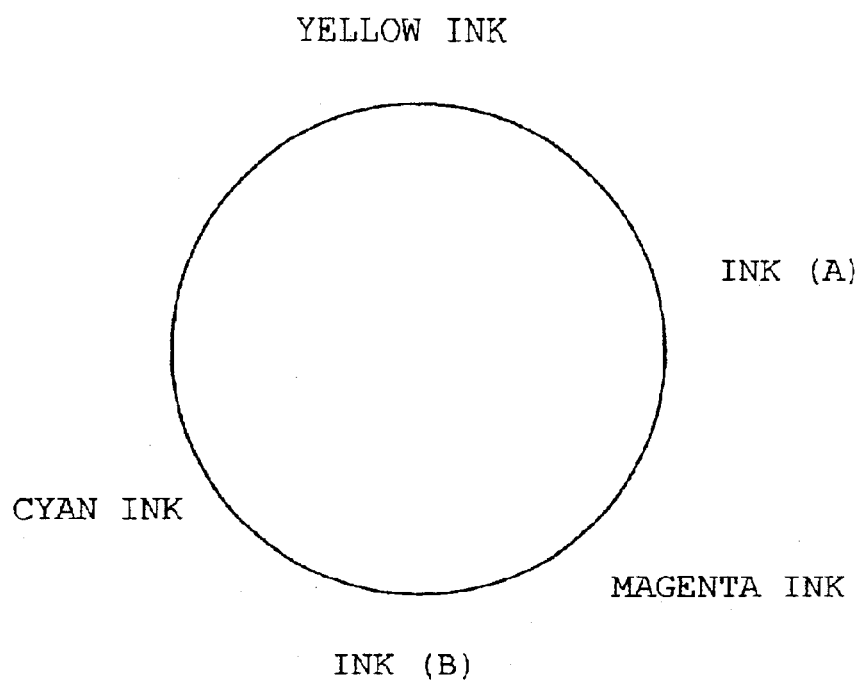
FIG. 6 is a drawing illustrating the combination of colors when producing a printed article, according to an example.

Colors evaluated: 100% duty single colors formed using an ink of one color, and 100% duty mixed colors formed using inks of two colors that are adjacent to one another in the circle shown in FIG. 6 each at 50% duty.

(Effectiveness of Special Inks)

For each of the printed articles produced using the ink sets of the working examples, the hue angle $\angle H°$ and the chroma $C^*$ of the 100% duty mixed color parts formed from two colors out of the inks of the three primary colors yellow, magenta and cyan were measured. The firing amounts of the special inks required to obtain the same hue angle $\angle H°$ and chroma $C^*$ as this were then measured. The results are shown in Tables 1 and 2 below.

TABLE 1

| Ink set | $\angle H°$ | $C^*$ | Magenta ink ($J_{1M}$) | Yellow ink ($I_Y$) | $J_{1M} + I_Y$ | Special ink (A) |
|---|---|---|---|---|---|---|
| 1 | 64 | 60 | 20% | 80% | 100% | 28% |

TABLE 2

| Ink set | ∠H° | C* | Magenta ink ($J_{2M}$) | Cyan ink (Kc) | $J_{2M}$ + Kc | Special ink (A) |
|---|---|---|---|---|---|---|
| 1 | 313 | 85 | 81% | 19% | 100% | 28% |

As can be seen from Tables 1 and 2, the chroma C* for the hue angle ∠H° at 100% duty formed using two colors out of the inks of the three primary colors yellow, magenta and cyan can be obtained at less than 30% duty using the special ink (A) or (B) according to the present invention.

Moreover, the optical density (OD value) on the recording medium was 1.7 for the yellow ink, 1.5 for the magenta ink, and 2.0 for the cyan ink in the ink set 1.

(Measurement of Absorption Area for Each Ink)

Measurements were carried out using a Hitachi U3300 self-recording spectrophotometer under measurement conditions of a scanning speed of 600 nm/min, a 2.0 nm slit, automatic control of the photomultiplier voltage, and the sampling interval on automatic.

The baseline was measured by setting on both the sample side and the reference side a quartz cell of volume 4 ml (length 1 cm×breadth 1 cm×height 4 cm) filled with pure water.

The sample measurements were taken by leaving the cell on the reference side as was, and putting into the cell on the sample side a diluted ink solution. Each diluted ink solution was obtained by putting 1.00 g of one of the inks into a 1 L beaker and immediately adding pure water to make up to 1 kg.

The results are shown in Table 3.

TABLE 3

|  | 400~500 nm | 500~600 nm | 600~700 nm | 400~500 nm/ 500~600 nm | 500~600 nm/ 600~700 nm |
|---|---|---|---|---|---|
| Yellow ink | 31 | — | — | — | — |
| Magenta ink | — | 33 | — | — | — |
| Cyan ink | — | — | 66 | — | — |
| Ink (A) | 65 | 39 | — | 1.67 | — |
| Ink (B) | — | 109 | 30 | — | 3.63 |

(Tests on Wrinkling and Coloring Ability)

For each of the ink sets of Working Examples 1 to 6 and Comparative Examples 1 and 2, printing was carried out on regular paper (trade name 'Xerox P', made by Xerox Corporation) using an ink jet printer (trade name 'MC-2000', made by Seiko Epson Corporation) having an integrated type recording head with a nozzle constitution as shown in FIG. 4. For all of Working Examples 1 to 6 (ink sets 1 to 6), the orange ink (ink (A)) was predominantly used when producing red, and the violet ink (ink (B)) was predominantly used when producing blue. On the other hand, for Comparative Example 1 (ink set 7) and Comparative Example 2 (ink set 8), the yellow ink and the magenta ink were used as conventionally when producing red, and the cyan ink and the magenta ink were used as conventionally when producing blue. For each of the printed articles obtained, the extent of wrinkling and the coloring ability were observed visually for the recorded image parts, and evaluation was carried out using the undermentioned evaluation criteria. The results are shown below in Table 4. Note that, during the printing, the case in which droplets of the reaction liquid are first discharged and then droplets of the inks are discharged, and the case in which droplets of the inks are first discharged and then droplets of the reaction liquid are discharged, were both carried out, but the results were the same (Table 4).

(Evaluation Criteria for Extent of Wrinkling)

○: Wrinkling did not occur in either single color parts or mixed color parts.
Δ: Wrinkling did not occur in single color parts, but did occur in mixed color parts.
X: Wrinkling occurred in both single color parts and mixed color parts.

(Evaluation Criteria for Coloring Ability)

○: Coloring was vivid in both single color parts and mixed color parts.
Δ: Coloring was vivid in single color parts, but was not vivid in mixed color parts.
X: Coloring was not vivid in either single color parts or mixed color parts.

TABLE 4

|  | Wrinkling | Coloring ability |
|---|---|---|
| Working Example 1 | ○ | ○ |
| Working Example 2 | ○ | ○ |
| Working Example 3 | ○ | ○ |
| Working Example 4 | ○ | ○ |
| Working Example 5 | ○ | ○ |
| Working Example 6 | ○ | ○ |
| Comparative Example 1 | Δ | Δ |
| Comparative Example 2 | ○ | X |

As can be seen from the results shown in Table 4, with all of the ink sets of Working Examples 1 to 6, printed articles can be provided for which wrinkling does not occur and coloring ability is excellent.

With the ink set of Comparative Example 1, because the ink set does not contain the special inks, the ink firing amount for mixed color parts was higher than with the ink sets of the working examples, and hence wrinkling occurred in the mixed color parts. Moreover, coloring in the mixed color parts was not vivid.

With the ink set of Comparative Example 2, because the ink set did not contain a reaction liquid, wrinkling was not observed, but coloring was not vivid not only in the mixed color parts but also in the single color parts.

[Effects of the Invention]

According to the ink set and the ink jet recording method of the present invention, a high-quality printed article can be provided for which wrinkling does not occur, the color density is high, and there is little blotting or unevenness even if regular paper is used as the recording medium.

What is claimed is:

1. An ink set comprising at least:

inks of three colors, that is a yellow ink having a hue angle ∠H° as defined in CIELAB color space on a recording medium in a range of approximately 80° to approximately 110°, a magenta ink having said hue angle ∠H° in a range of approximately 330° to approximately 360°, and a cyan ink having said hue angle ∠H° in a range of approximately 230° to approximately 260°;

an ink (A) and/or an ink (B); and a reaction liquid containing a reactant;

wherein said ink (A) is an ink having said hue angle ∠H° in a range of approximately 0° to approximately 80°;

said ink (B) is an ink having said hue angle ∠H° in a range of approximately 260° to approximately 330°;

and said hue angle ∠H° is $\tan^{-1}(b^*/a^*)+180°$ in the case that $a^*<0$ and $\tan^{-1}(b^*/a^*)+360°$ in the case that $a^*>0$, where a* and b* represent the perceived chromaticity indices as defined in CIELAB color space.

2. The ink set according to claim 1, wherein said ink (A) and said ink (B) each have a lightness lower than the lightness of said magenta ink and the lightness of said cyan ink, and said ink (A) and said ink (B) each have a chroma higher than the chroma of said magenta ink and the chroma of said cyan ink.

3. The ink set according to claim 1, wherein said yellow ink has an optical density (OD value) on a recording medium in a range of 1.7 to 2.4.

4. The ink set according to claim 1, wherein said yellow ink has an optical density (OD value) on a recording medium in a range of 1.7 to 2.4.

5. The ink set according to claim 1, wherein said magenta ink has an optical density (OD value) on a recording medium in a range of 1.0 to 2.6.

6. The ink set according to claim 1, wherein said ink (A) is an ink such that a chroma $C^*_{(Y+M)}$ for a hue angle $\angle H°_{(Y+M)}$ obtained by mixing on a recording medium a weight $I_Y$ of said yellow ink and a weight $J_{2m}$ of said magenta ink can be obtained by using an amount less than the weight $I_Y+J_{1M}$, where said chroma C* is $\{(a^*)^2+(b^*)^2\}^{1/2}$.

7. The ink set according to claim 1, wherein said ink (B) is an ink such that a chroma $C^*_{(M-C)}$ for a hue angle $\angle H°_{(M+C)}$ obtained by mixing on a recording medium a weight J2M of said magenta ink and a weight $K_c$ of said cyan ink can be obtained by using an amount less than the weight $J_{2M}+K_c$.

8. The ink set according to claim 1, wherein the chroma $C^*_A$ of said ink (A) is higher than the chroma $C^*_Y$ of said yellow ink and/or the chroma $C^*_M$ of said magenta ink.

9. The ink set according to claim 1, wherein the chroma $C^*_B$ of said ink (B) is higher than the chroma $C^*_M$ of said magenta ink and/or the chroma $_{C^*_c}$ of said cyan ink.

10. The ink set according to claim 1, wherein the chroma $C^*_A$ of said ink (A) on a recording medium is at least 80.

11. The ink set according to claim 1, wherein the chroma $C^*_B$ of said ink (B) on a recording medium is at least 80.

12. The ink set according to claim 1, wherein the hue range of said ink (A) on a recording medium is such that a* is in a range of approximately 60 to approximately 80 and b* is in a range of approximately 20 to approximately 80, or a* is in a range of approximately 30 to approximately 60 and b* is in a range of approximately 60 to approximately 100.

13. The ink set according to claim 1, wherein the hue range of said ink (B) on a recording medium is such that a* is in a range of approximately 50 to approximately 70 and b* is in a range of approximately −70 to approximately −50, or a* is in a range of approximately 40 to approximately 60 and b* is in a range of approximately −80 to approximately −60.

14. The ink set according to claim 1, wherein the hue range of said yellow ink on a recording medium is such that a* is in a range of approximately −30 to approximately 20 and b* is in a range of approximately 70 to approximately 130, the hue range of said magenta ink on the recording medium is such that a* is in a range of approximately 60 to approximately 90 and b is in a range of approximately −40 to approximately −10, and the hue range of said cyan ink on the recording medium is such that a* is in a range of approximately −50 to approximately −20 and b* is in a range of approximately −70 to approximately −40.

15. The ink set according to claim 1, wherein coloring agents contained in said inks are pigments.

16. The ink set according to claim 15, wherein said pigment contained in said ink (A) comprises one or more selected from the group consisting of C.I. pigment oranges 5, 43 and 62, and C.I. pigment reds 17, 49:2, 112, 149, 177, 178, 188, 255 and 264.

17. The ink set according to claim 15, wherein said pigment contained in said ink (B) comprises one or more selected from the group consisting of C.I. pigment blue 60, and C.I. pigment violets 3, 19, 23, 32, 36 and 38.

18. The ink set according to claim 15, wherein said pigment contained in said yellow ink comprises one or more selected from the group consisting of C.I. pigment yellows 1, 2, 3, 12, 13, 14, 16, 17, 73, 74, 75, 83, 93, 95, 97, 98, 109, 110, 114, 128, 129, 138, 139, 147, 150, 151, 154, 155, 180 and 185.

19. The ink set according to claim 15, wherein said pigment contained in said magenta ink comprises one or more selected from the group consisting of C.I. pigment reds 5, 7, 12, 48 (Ca), 48 (Mn), 57 (Ca), 57:1, 112, 122, 123, 168, 184, 202 and 209, and C.I. pigment violet 19.

20. The ink set according to claim 15, wherein said pigment contained in said cyan ink comprises one or more selected from the group consisting of C.I. pigment blues 1, 2, 3, 15:3, 15:4, 15:34, 16, 22 and 60, and C.I. vat blues 4 and 60.

21. The ink set according to claim 15, wherein the content of said pigment in each of said yellow ink, said magenta ink and said cyan ink is no less than 0.1 wt % and no more than 2 wt %, and the content of said pigment in each of said ink (A) and said ink (B) is no less than 2 wt % and no more than 6 wt %.

22. The ink set according to claim 15, wherein the content of said pigment in each of said magenta ink and said cyan ink is no more than 2 wt %, and the content of said pigment in each of said ink (A), said ink (B) and said yellow ink is at least 2 wt %.

23. The ink set according to claim 15, wherein the content of said pigment in each of said yellow ink, said magenta ink, said cyan ink, said ink (A) and said ink (B) is at least 2 wt %.

24. The ink set according to claim 1, wherein said reactant comprises one or more selected from the group consisting of polyvalent metal salts, polyallylamine and derivatives thereof, polyacrylamide and derivatives thereof, and polyethylenimine.

25. The ink set according to claim 1, further comprising a black ink.

26. An ink jet recording method of forming characters and/or images on a recording medium using the ink set according to claim 1.

27. A recorded article on which characters and/or images have been formed using the ink jet recording method according to claim 26.

28. An ink set comprising:

a yellow ink having an absorption spectrum with an absorption area over 400 nm to 500 nm of no less than 30 abs·nm and no more than 350 abs·nm;

a magenta ink having an absorption spectrum with an absorption area over 500 nm to 600 nm of no less than 20 abs·nm and no more than 200 abs·nm;

a cyan ink having an absorption spectrum with an absorption area over 600 nm to 700 nm of no less than 50 abs·nm and no more than 400 abs·nm;

an ink (A) and/or an ink (B); and a reaction liquid containing a reactant;

wherein said ink (A) is an ink having an absorption area over 500 nm to 600 nm equal to or greater than the absorption area over 500 nm to 600 nm of said magenta ink;

and said ink (B) is an ink having an absorption area over 500 nm to 600 nm equal to or greater than the absorption area over 600 nm to 700 nm of said cyan ink.

29. The ink set according to claim 28, wherein the absorption area over 500 nm to 600 nm of said ink (A) is in the range of 1.0 time to 3.5 times the absorption area over 500 nm to 600 nm of said magenta ink.

30. The ink set according to claim 28, wherein the absorption area over 500 nm to 600 nm of said ink (B) is in a range of 1.0 time to 3.0 times the absorption area over 600 nm to 700 nm of said cyan ink.

31. An ink set comprising:

a yellow ink having an absorption spectrum with an absorption area over 400 nm to 500 nm of no less than 30 abs·nm and no more than 350 abs·nm;

a magenta ink having an absorption spectrum with an absorption area over 500 nm to 600 nm of no less than 20 abs·nm and no more than 200 abs·nm;

a cyan ink having an absorption spectrum with an absorption area over 600 nm to 700 nm of no less than 50 abs·nm and no more than 400 abs·nm;

an ink (A) and/or an ink (B); and a reaction liquid containing a reactant;

wherein said ink (A) is an ink such that the absorption area over 400 nm to 500 nm of said ink (A) is in a range of 0.5 times to 2.0 times the absorption area over 500 nm to 600 nm of said ink (A);

and said ink (B) is an ink such that the absorption area over 500 nm to 600 nm of said ink (B) is in a range of 0.5 times to 5.0 times the absorption area over 600 nm to 700 nm of said ink (B).

32. An ink jet recording method of forming characters and/or images on a recording medium using the ink set according to claim 1, wherein droplets of said inks and said reaction liquid are discharged such that said inks and said reaction liquid come into contact with one another on said recording medium, and in the case of forming mixed color parts of one or more colors on said recording medium by mixing droplets of a plurality of said inks on said recording medium, at least one of said inks other than said ink (A) and said ink (B), and said ink (A) and/or said ink (B) are used.

33. The ink jet recording method according to claim 26, wherein droplets of said reaction liquid are discharged, and then droplets of said inks are discharged to form characters and/or images on said recording medium.

34. The ink jet recording method according to claim 26, wherein droplets of said inks are discharged to form characters and/or images on said recording medium, and then droplets of said reaction liquid are discharged.

35. The ink jet recording method according to claim 30, wherein said recording medium is regular paper.

* * * * *